United States Patent
Wei et al.

(10) Patent No.: US 10,793,663 B2
(45) Date of Patent: Oct. 6, 2020

(54) POLYURETHANE FOAM AND A POLYURETHANE COMPOSITE COMPRISING THE SAME

(71) Applicant: COVESTRO DEUTSCHLAND AG, Leverkusen (DE)

(72) Inventors: Wenping Wei, Shanghai (CN); Chunlei Zheng, Shanghai (CN); Yefen Wei, Shanghai (CN)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 46 days.

(21) Appl. No.: 16/094,524

(22) PCT Filed: May 12, 2017

(86) PCT No.: PCT/CN2017/084139
§ 371 (c)(1),
(2) Date: Oct. 18, 2018

(87) PCT Pub. No.: WO2017/198115
PCT Pub. Date: Nov. 23, 2017

(65) Prior Publication Data
US 2019/0119430 A1    Apr. 25, 2019

(30) Foreign Application Priority Data
May 20, 2016  (CN) .......................... 2016 1 0370868

(51) Int. Cl.
| | | |
|---|---|---|
| *C08G 18/48* | (2006.01) | |
| *C08G 18/08* | (2006.01) | |
| *C08G 101/00* | (2006.01) | |
| *C08G 18/76* | (2006.01) | |
| *C08L 75/04* | (2006.01) | |
| *C08G 18/72* | (2006.01) | |
| *C08J 9/12* | (2006.01) | |
| *C08J 9/14* | (2006.01) | |

(52) U.S. Cl.
CPC ........... *C08G 18/482* (2013.01); *C08G 18/14* (2013.01); *C08G 18/4833* (2013.01); *C08G 18/4883* (2013.01); *C08G 18/72* (2013.01); *C08G 18/7664* (2013.01); *C08J 9/125* (2013.01); *C08J 9/146* (2013.01); *C08L 75/04* (2013.01); *C08G 2101/005* (2013.01); *C08G 2101/0058* (2013.01); *C08G 2120/00* (2013.01); *C08J 2203/10* (2013.01); *C08J 2203/144* (2013.01); *C08J 2203/164* (2013.01); *C08J 2205/052* (2013.01); *C08J 2375/04* (2013.01)

(58) Field of Classification Search
CPC .............. C08G 18/4816; C08G 18/482; C08G 18/4883
See application file for complete search history.

(56) References Cited

U.S. PATENT DOCUMENTS

| | | | | |
|---|---|---|---|---|
| 4,742,089 A | * | 5/1988 | Naka .................... | C08G 18/482 521/110 |
| 5,034,425 A | * | 7/1991 | Kuroishi ............ | C08G 18/4812 521/131 |
| 6,306,920 B1 | * | 10/2001 | Heinemann .......... | C08G 18/482 521/174 |
| 6,335,378 B1 | | 1/2002 | Colman | |
| 2002/0019452 A1 | * | 2/2002 | Roels ................. | C08G 18/4018 521/170 |
| 2004/0176495 A1 | | 9/2004 | You et al. | |
| 2006/0229371 A1 | | 10/2006 | Park et al. | |
| 2007/0232712 A1 | * | 10/2007 | Emge ................. | C08G 18/7664 521/176 |
| 2007/0259981 A1 | | 11/2007 | Eling et al. | |

FOREIGN PATENT DOCUMENTS

| | | |
|---|---|---|
| CN | 101035826 A | 9/2007 |
| CN | 101289530 A | 10/2008 |
| CN | 103709367 A | 4/2014 |
| CN | 104072717 A | 10/2014 |
| JP | 08073554 A  * | 3/1996 |

OTHER PUBLICATIONS

Machine Translation of JPH08-73554A. Mar. 19, 1996. (Year: 1996).*
Machine Translation of CN101289530A. Oct. 22, 2008. (Year: 2008).*
International Search Report for PCT/CN2017/084139, dated Aug. 18, 2017.
Written Opinion of the International Searching Authority for PCT/CN2017/084139, dated Aug. 18, 2017.

* cited by examiner

*Primary Examiner* — Stephen E Rieth
(74) *Attorney, Agent, or Firm* — K&L Gates LLP

(57) ABSTRACT

The present invention relates to an isocyanate reactive component comprising a specific polyol mixture useful for the preparation of homogenous reactive polyurethane compositions. The invention further relates to a reactive polyurethane composition comprising such isocyanate reactive component and an isocyanate component. It also relates to a homogeneous polyurethane foam having good mold release property and surface quality prepared from such reactive polyurethane compositions. In a further aspect, it relates to a polyurethane composite comprising such homogenous polyurethane foam and having good and flat surface appearance after processing.

13 Claims, 1 Drawing Sheet

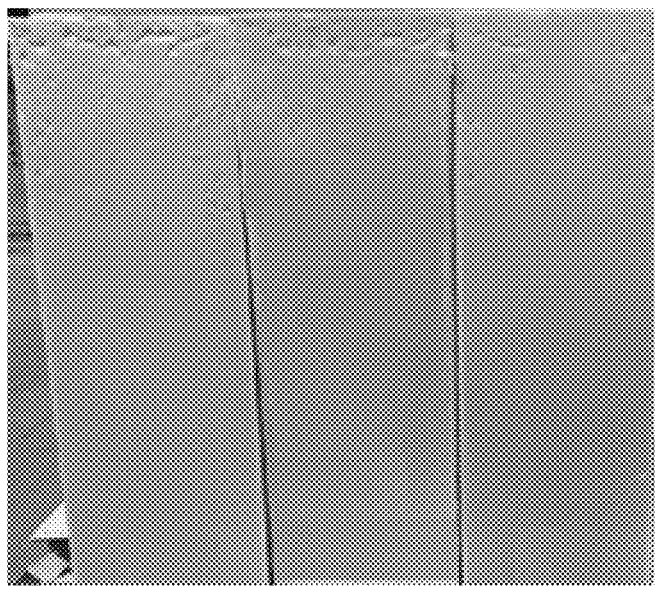

US 10,793,663 B2

POLYURETHANE FOAM AND A POLYURETHANE COMPOSITE COMPRISING THE SAME

CROSS-REFERENCE TO RELATED APPLICATIONS

This application is a U.S. national stage application, filed under 35 U.S.C. § 371, of International Application No. PCT/CN2017/084139, which was filed on May 12, 2017, and which claims priority to Chinese Patent Application No. 201610370868.X, which was filed on May 20, 2016. The contents of each are incorporated by reference into this specification.

FIELD

The present invention relates to an isocyanate reactive component comprising a specific polyol mixture useful for the preparation of homogenous reactive polyurethane compositions. The invention further relates to a reactive polyurethane composition comprising such isocyanate reactive component and an isocyanate component. It also relates to a homogenous polyurethane foam having good mold release property and surface quality prepared from such reactive polyurethane compositions. In a further aspect, it relates to a polyurethane composite comprising such homogenous polyurethane foam and having good and flat surface appearance after processing.

BACKGROUND

The polyurethane composites as they are referred to in this application generally comprise a shell and a polyurethane foam filled therein.

A highly flexible and widely applied process for the production of heat insulation systems, such as a container, a refrigerator, prefabricated houses, pipelines and insulation panels of an air-conditioner, and others, is a discontinuous process wherein polyurethane composites are prepared in the form of plate parts in a plate-shaped shell, and then these plate parts are assembled to the respective heat insulation system. Alternatively, a prefabricated hollow shell of any geometry, e.g. assembled from various panels, may be used.

The discontinuous process for the production of the polyurethane composite comprises the following steps: disposing the prefabricated shell in a mold, injecting the reactive polyurethane composition into the mold and closing the mold. Then, the polyurethane resin is foamed. Finally, the polyurethane composite is obtained by releasing from the mold.

The prior art already discloses various reactive polyurethane compositions, which are usually prepared by mixing an isocyanate component and a polyol component. However, in the compositions of the prior art, solubility problems frequently occur which most often result from the deficient miscibility of the polyols and the foaming agent. Consequently, polyurethane foams made from such compositions often are less homogeneous, and this also leads to quality problems in the products containing the polyurethane materials prepared therefrom, i.e. the polyurethane composites.

In addition, a known problem of the polyurethane foam made from the existing reactive polyurethane compositions is the poor mold release property of the composites, that is, an expansion to a certain extent after mold releasing may be observed, which results in the coarse and uneven surface of the polyurethane composites prepared. Furthermore, the polyurethane foams made from the known reactive polyurethane compositions may also show the problem of surface bubbles, which then lead to bulges or even serious quality problems occurring in the polyurethane composites prepared therefrom.

SUMMARY

Therefore, there remains a need in the art for a polyurethane composite comprising a homogeneous polyurethane foam and having a good and flat surface appearance, which is prepared by a discontinuous process comprising the steps of injecting a reactive polyurethane composition into a shell provided in a mold, and foaming such reactive composition.

It has now surprisingly been found that the problems of the prior art may be overcome by the use of an isocyanate reactive component B) comprising a polyether polyol composition, said polyether polyol composition comprising:

b1) a first polyether polyol, having a functionality of 1.6-2.4, a hydroxyl value of 60-140 mg KOH/g, in an amount of 30-40 mol-%, based on the theoretically calculated total mole number of said polyether polyol composition, b2) a second polyether polyol, having a functionality of 7.6-8.4, a hydroxyl value of 480-560 mg KOH/g, in an amount of 35-55 mol-%, based on the theoretically calculated total mole number of said polyether polyol composition, and b3) a third polyether polyol, selected from polyether polyols derived from diphenylmethane diamine and/or toluenediamine, having a functionality of 3.6-4.4, and a hydroxyl value of 290-370 mg KOH/g, in an amount of 13-27 mol-% based on the theoretically calculated total mole number of said polyether polyol composition.

The present invention furthermore provides a reactive polyurethane composition useful for the production of polyurethane foams with good and flat surface appearance, comprising:

A) an isocyanate component, said isocyanate component comprising one or more polyisocyanate(s);

B) an isocyanate reactive component comprising a polyether polyol composition, said polyether polyol composition comprising:

b1) a first polyether polyol, having a functionality of 1.6-2.4, a hydroxyl value of 60-140 mg KOH/g, in an amount of 30-40 mol-%, based on the theoretically calculated total mole number of said polyether polyol composition, b2) a second polyether polyol, having a functionality of 7.6-8.4, a hydroxyl value of 480-560 mg KOH/g, in an amount of 35-55 mol-%, based on the theoretically calculated total mole number of said polyether polyol composition, and b3) a third polyether polyol, selected from polyether polyols derived from diphenylmethane diamine and/or toluenediamine, having a functionality of 3.6-4.4, and a hydroxyl value of 290-370 mg KOH/g, in an amount of 13-27 mol-% based on the theoretically calculated total mole number of said polyether polyol composition; and C) a foaming agent.

BRIEF DESCRIPTION OF THE DRAWINGS

The features and advantages of the examples, and the manner of attaining them, will become more apparent, and the examples will be better understood by reference to the following description taken in conjunction with the accompanying drawings, wherein:

FIG. 1 illustrates the surface qualities of the obtained polyurethane foams of Comparative Examples 1 and 9 and Example 5.

DETAILED DESCRIPTION

The organic polyisocyanates of component A), which can be used in the preparation of polyurethane foams, include organic diisocyanates which may be any aliphatic-, cycloaliphatic- or aromatic-isocyanates known to be useful in the preparation of polyurethanes. Examples thereof include, but are not limited to, 2,2'-, 2,4- and 4,4'-diphenylmethane diisocyanates (monomeric MDI); mixtures of monomeric diphenylmethane diisocyanates and diphenylmethane diisocyanate homologs having more rings (polymeric MDI); isophorone diisocyanate (IPDI) or oligomers thereof; toluene diisocyanates (TDI), e.g. toluene diisocyanate isomers such as toluene-2,4- or 2,6-diisocyanates, or mixtures thereof; tetramethylene diisocyanate or oligomers thereof; hexamethylene diisocyanate (HDI) or oligomers thereof; naphthalene diisocyanates (NDI) or mixtures thereof.

In the preferred embodiments of the present invention, the organic polyisocyanates include isocyanates based on diphenylmethane diisocyanates, especially those comprising polymeric MDI. The organic polyisocyanate preferably has a functionality of 1.9-3.5, particularly preferably 2.0-2.8. The organic polyisocyanate preferably has a viscosity of 100-600 mPas, particularly preferably 150-300 mPas, measured according to GB/T 12008.8-1992 at 25° C. The isocyanate component may be present in an amount of 20-60 wt. %, based on the total weight of said polyurethane composition as 100 wt. %.

The organic polyisocyanates also can be used in the form of polyisocyanate prepolymers. These polyisocyanate prepolymers can be obtained by the reaction of an excess of the above-mentioned organic polyisocyanate with a compound having at least two isocyanate-reactive groups at a temperature of, for example, 30-100° C., preferably about 80° C. The NCO content of the polyisocyanate prepolymer of the present invention is preferably 20-33 wt. % (GB 12009.4-1989), particularly preferably 25-32 wt. %. The compounds with at least two isocyanate-reactive groups are well known to those skilled in the art, for example as illustrated in Chapter 3.1 of the "Plastics Handbook" ("Kunststoffhandbuch, 7, Polyurethanes", Carl Hanser-Verlag, 3rd ed., 1993).

The isocyanate-reactive component that can be used to prepare the polyurethane foams provided by the present invention comprises a polyether polyol composition. As used therein, "a polyether polyol" has a definition well known to those skilled in the art. It can be prepared by known processes, for example, by the reaction of an alkylene oxide with a starting agent in the presence of a catalyst. The use of the word "a" in conjunction with components according to the invention such as for example certain polyols shall not be understood within the meaning of this application as a numerical value. The term "polyol" may therefore also define a mixture of polyols, in such case the parameters required for the individual polyols (such as functionality, hydroxyl value etc.) correspond to the average values measured or calculated for the respective polyol mixture.

For example, the term "functionality" within the context of the present invention refers to the theoretical functionality calculated from the known components used and the proportions thereof in the polyol mixture.

The first polyether polyol b1) which is to be used in the present invention has a functionality of 1.6-2.4, preferably 1.8-2.2, a hydroxyl value of 60-140 mg KOH/g, preferably 80-120 mg KOH/g (measured according to GB/T12008.3-2009), and is used in an amount of 30-40 mol-%, preferably in an amount of 32-38 mol-%, based on the theoretically calculated total mole number of the polyether polyol composition.

In preferred embodiments of the present invention, the first polyether polyol is selected from the group consisting of the polyether polyols derived from 1,2-propanediol and/or 1,3-propanediol. More preferably, the first polyether polyol is selected from the propylene oxide-based polyether polyols derived from 1,2-propanediol.

The second polyether polyol b2) which is to be used in the present invention has a functionality of 7.6-8.4, preferably 7.8-8.2, a hydroxyl value of 480-560 mg KOH/g, preferably 490-530 mg KOH/g, and is used in an amount of 35-55 mol-%, in preferred embodiments in an amount of 35-50 mol-% or 35-45 mol-%, respectively, even more preferred in an amount of 40-50 mol-% or 38-48 mol-%, respectively, based on the theoretically calculated total mole number of said polyether polyol composition.

In a preferred embodiment of the present invention, the first polyether polyol is selected from the polyether polyols derived from saccharose. More preferably, the first polyether polyol is selected from the propylene oxide-based polyether polyols derived from saccharose.

The third polyether polyol b3), which is to be used in the present invention, is selected from the polyether polyols derived from diphenylmethane diamine and/or tolylenediamine, and has a functionality of 3.6-4.4, preferably 3,8-4,2, and a hydroxyl value of 290-370 mg KOH/g, preferably 320 mg KOH/g-360 mg KOH/g, and is used in an amount of 13-27 mol-%, in preferred embodiments in an amount of 15-25 mol-%, respectively, and particularly preferably 17-23 mol-%, based on the theoretically calculated total mole number of said polyether polyol composition. Ortho-tolylenediamine or diphenylmethane diamines (all isomers) are preferably used as the starter. Ortho-tolylene diamine (o-TDA) can be in the form of a mixture of 2,3- and 3,4-isomers. Propylene oxide-based polyether polyols derived from o-TDA are particularly preferred for the third polyether. In another particularly preferred embodiment of the present invention, the third polyether polyol is selected from the propylene oxide-based polyether polyols derived from diphenylmethane diamines.

The polyether polyol composition comprising the above-mentioned polyether polyols b1)-b3) exhibits an average functionality of 3.5-6, preferably 4.5-5.5, and an average hydroxyl value of 280-450 mg KOH/g, preferably 300-350 mg KOH/g.

The isocyanate reactive composition, which is used in the preparation of the polyurethane foams provided by the present invention, further includes a foaming agent C). Said foaming agent can be selected from various physical foaming agents or chemical foaming agents, preferably but not limited to water, halogenated hydrocarbons, hydrocarbon compounds, and gases, preferably n-pentane, isopentane, cyclopentane, butane, isobutane, ethers (e.g. methylal), halogenated ethers, perfluorinated hydrocarbons having 1 to 8 carbon atoms (e.g. perfluorohexane), hydroolefins and mixtures thereof with one another. In a preferred embodiment of the present invention, said foaming agent is selected from the group consisting of water, dichlorofluoroethane, cyclopentane, pentafluorobutane, pentafluoropropane, trifluorochloropropylene, hexafluorobutene or the combinations thereof. In another preferred embodiment of the present invention, said foaming agent is present in an amount of 2-30 wt. %, preferably 5-25 wt. %, based on the weight of the isocyanate-reactive component as 100 wt. %. Cyclopentane is exceptionally particularly preferably used as the blowing agent.

The addition of water or other chemical blowing agents as co-blowing agents is also preferred. If used, it is normally added in an amount of 0-6 wt-%, based on the weight of the total isocyanate reactive component, including and foaming agents, as 100 wt. %.

The components, which can be used in the preparation of the polyurethane foams according to the present invention, may further comprise other aids or additives commonly used in the art, including but not limited to, catalysts, flame retardants, and foam stabilizers, or the like.

In one embodiment of the present invention, the core density of said polyurethane foam is 35-70 kg/m$^3$ (GB/T 6343-1995).

In another embodiment of the present invention, the closed cell proportion of said polyurethane foam is 85-98% (GB/T 10799-2008).

Among the components which can be used in the preparation of the polyurethane foams according to the present invention, the isocyanate-reactive component B) has a good compatibility with the foaming agent component C), thus enable preparing foams with a homogeneous distribution. At the same time, the polyurethane foams prepared therefrom and the polyurethane composites made with the foam have a good mold release property, as well as a good surface quality.

The present invention also provides a polyurethane composite prepared by a discontinuous process comprising the steps of:
  i) providing a shell in a mold
  ii) closing the mold
  iii) injecting the inventive reactive polyurethane composition in said shell in the mold
  iv) foaming the reactive polyurethane composition
  v) releasing the resulting polyurethane composite comprising the shell and the polyurethane foam from the mold.

In one alternative, the shell may consist of cover panels which are placed and optionally attached at the inner walls of the mold before closing the mold.

In another alternative embodiment of the process, a hollow shell part is firstly prefabricated using panel materials, such as metal, plastic and composite plates, etc.; then the seam portion of the hollow shell part is subjected to a sealing treatment with the injection hole and vent hole remained; and finally the hollow shell part is disposed into the foam molding mold; the inventive reactive polyurethane composition is introduced into the cavity of the hollow shell part through the injection hole of the mold and the hollow shell part; and the polyurethane composite comprising the foam and the shell is removed from the mold after the foaming reaction of the reactive polyurethane composition is completed.

In some embodiments of the present invention, said prefabricated shell has a plate-like or hollow cylindrical shape.

The present invention also provides polyurethane composites prepared by the inventive discontinuous process.

The polyurethane composites prepared by this discontinuous process may advantageously be used for the production of roof panels, side panels, bottom panels, or door panels of a container; roof panels, side panels, or bottom panels, or door panels of a prefabricated house; roof panels, side panels, or bottom panels, or door panels of a refrigerator house; insulation panels of an air-conditioner and insulation pipelines.

Examples

The invention is further described as below in combination with specific examples. It is to be understood by those skilled in the art, however, that these examples are merely illustrative of the present invention and are not construed to be restrictive of the scope of the invention.

The commercially available raw materials used in the examples are shown below:

Polyol 1: a propylene oxide-based polyether polyol with propylene glycol as the initiator, having a functionality of 2 and a hydroxyl value of 100 mg KOH/g;

Polyol 2: a propylene oxide-based polyether polyol with saccharose as the initiator, having a functionality of 8 and a hydroxyl value of 525 mg KOH/g;

Polyol 3: a propylene oxide-based polyether polyol with o-TDA as the initiator, having a functionality of 4 and a hydroxyl value of 345 mg KOH/g;

Yoke TCPP: Tris(2-chloroisopropyl) phosphate, a flame retardant, purchased from Jiangsu Yoke Technology Co., Ltd.;

Niax L6920: a foam stabilizer, purchased from Momentive Performance Materials (China) Co., Ltd.;

Dabco Polycat 41: a polyurethane synthesis catalyst, purchased from Air Products and Chemicals (China) Co., Ltd.;

Dabco Polycat PC8: a polyurethane synthesis catalyst, purchased from Air Products and Chemicals (China) Co., Ltd.;

Desmodur® 44V20L: polymeric MDI, having an NCO content of 31.5 wt. %, purchased from Covestro Polymers (China) Co., Ltd.

Preparation of Polyurethane Composites

The prefabricated hollow shell part (panel shape) was placed in the mold and the mold was closed. The hollow shell member was preheated in the mold until the surface temperature of its surface material reached 30-45° C.

The components in Table 1 (total quantity: 80 kg) except for the isocyanate and physical blowing agent component were mixed under stirring to obtain an isocyanate reactive mixture.

Thereafter, the isocyanate reactive mixture and the isocyanate component were introduced and mixed in the mixing head of the high-pressure foaming machine (the mixing head was at a pressure of 100 to 160 bar).

The polyurethane reactive mixture was then injected into the prefabricated hollow shell part in the mold through the mixing head, foamed and expanded in the hollow shell until the hollow shell was fully filled. After the foaming reaction was completed, the foamed article was removed from the mold and the polyurethane composite was obtained.

Compatibility Testing Method

Cyclopentane and combined polyether stock (i.e., all components listed in Table 1 except for the isocyanate and cyclopentane) were mixed thoroughly, wherein the mixing weight ratio of cyclopentane to the combined polyether was 12:100, 15:100, 18:100 and 21:100. After well mixed, the solution was sealed with the transparent tube and left to stand at room temperature (20° C.) for 72 hours to be observed. If the solution within the tube shows clarity, it reveals an excellent compatibility; if the solution within the tube shows slight turbidity, it reveals a good compatibility; whereas, if the solution within the tube shows severe turbidity, two-phase or multi-phase separation, it reveals a poor compatibility. The testing results in Table 1 show that the compatibility of the formulations 1, 2 and 3 was poor, good and excellent, respectively.

The bubbles on the surfaces of the L-shaped foams were analyzed as follows:
i. the depth of the bubble,
ii. the volume of the bubble and
iii. the total number of the bubbles.

The smaller these three values, the better is the overall surface bubble performance (surface quality). The surface

TABLE 1

Formulations of the polyurethane foam and the compatibility thereof

| | Formulations | | | | | | | | | | | |
|---|---|---|---|---|---|---|---|---|---|---|---|---|
| | 1 (Comparative) | | | | 2 Example | | | | 3 (Comparative) | | | |
| | 1 | 2 | 3 | 4 | 5 | 6 | 7 | 8 | 9 | 10 | 11 | 12 |
| Polyol 1, mol-%[1] | | | 45 | | | | 35 | | | | 25 | |
| Polyol 2, mol-%[1] | | | 45 | | | | 45 | | | | 45 | |
| Polyol 3, mol-%[1] | | | 10 | | | | 20 | | | | 30 | |
| Yoke TCPP, pbw | 10 | 10 | 10 | 10 | 10 | 10 | 10 | 10 | 10 | 10 | 10 | 10 |
| Niax L6920, pbw | 2 | 2 | 2 | 2 | 2 | 2 | 2 | 2 | 2 | 2 | 2 | 2 |
| Dabco Polycat PC8, pbw | 0.7 | 0.7 | 0.7 | 0.7 | 0.7 | 0.7 | 0.7 | 0.7 | 0.7 | 0.7 | 0.7 | 0.7 |
| Dabco Polycat 41, pbw | 0.7 | 0.7 | 0.7 | 0.7 | 0.7 | 0.7 | 0.7 | 0.7 | 0.7 | 0.7 | 0.7 | 0.7 |
| Water, wt-%[2] | 1.5 | 1.5 | 1.5 | 1.5 | 1.5 | 1.5 | 1.5 | 1.5 | 1.5 | 1.5 | 1.5 | 1.5 |
| Polyol masterbatch, pbw | 100 | 100 | 100 | 100 | 100 | 100 | 100 | 100 | 100 | 100 | 100 | 100 |
| Cyclopentane, pbw | 12 | 15 | 18 | 21 | 12 | 15 | 18 | 21 | 12 | 15 | 18 | 21 |
| Isocyanate, pbw | 118 | 118 | 118 | 118 | 118 | 118 | 118 | 118 | 118 | 118 | 118 | 118 |
| Compatibility test | Clear | Clear | Turbid | delamination | Clear | Clear | Clear | Slightly turbid | Clear | Clear | Clear | Clear |
| Compatibility grading | | Poor | | | | Good | | | | Excellent | | |

[1]mol-% based on the theoretically calculated total mole number of the polyether polyol composition (polyols 1-3)
[2]wt.-% in relation to the polyurethane reactive composition Testing Method for Mold Release Performance A mold of 300×300×100 mm was used with the mold temperature controlled at 40° C. and the overall foam density of the mold was 55 kg/m³. The components in Table 2 (total quantity=495 g) were mixed and then disposed into a carton box placed in the mold. The mold was firmly closed. The foaming reaction took place in the mold. After 20 minutes starting from the mixing of the components, the mold was opened and the foamed molding product was taken out. The maximum expansion height at the center of the foamed molding product was measured. The larger the expansion height is, the worse the mold release performance is. Generally, an expansion height of 1.0-3.5 mm reveals a good mold release performance. The testing results are shown in Table 2 below.

TABLE 2

Tests for the mold release property

| | Comp. Ex. 1 | Ex. 5 | Comp. Ex. 9 |
|---|---|---|---|
| Expansion height (mm) | 4.5 | 2.6 | 1.8 |

Surface Bubble Test

An L-shaped mold was used with the mold temperature controlled at 40° C. and the inner surface of the mold was evenly coated with a mold release agent. The overall foam density of the mold was 55 kg/m³. The formulations in Table 1 were mixed and then disposed into the mold. The mold was closed and the foaming reaction took place in the mold. After 30 minutes starting from the mixing of the components, the mold was opened and the foamed molding product was taken out.

qualities of the obtained polyurethane foams of Comparative Examples 1 and 9, and Example 5 are shown in FIG. 1. Table 3 demonstrates the results of the analysis of the surface qualities for the polyurethane foams. FIG. 1 shows a picture of the foams: On the left side is the foam of Comparative Example 9, the middle is the foam of Example 5, and the right side is the foam of Comparative Example 1.

TABLE 3

Surface bubble tests for the polyurethane foam

| | Comp. Ex. 1 | Ex. 5 | Comp. Ex. 9 |
|---|---|---|---|
| Surface bubble grading | Excellent | Good | Poor |

By comparing the compatibility, mold release property and surface property of the formulations above, it is found that only inventive formulation 2 achieves the advantageous balance between each of the properties.

The invention claimed is:

1. An isocyanate reactive component B) comprising a polyether polyol composition, the polyether polyol composition comprising:
b1) 30-40 mol-%, based on the theoretically calculated total mole number of the polyether polyol composition, of a first polyether polyol, having a functionality of 1.6-2.4, a hydroxyl value of 60-140 mg KOH/g,
b2) 35-55 mol-%, based on the theoretically calculated total mole number of the polyether polyol composition, of a second polyether polyol, having a functionality of 7.6-8.4, a hydroxyl value of 480-560 mg KOH/g, and
b3) 13-27 mol-%, based on the theoretically calculated total mole number of the polyether polyol composition a third polyether polyol, selected from polyether polyols derived from diphenylmethane diamine and/or toluenediamine, having a functionality of 3.6-4.4, and a hydroxyl value of 290-370 mg KOH/g.

2. The isocyanate reactive component according to claim 1, wherein the second polyether polyol is selected from the group consisting of polyether polyols derived from saccharose.

3. The isocyanate reactive component according to claim 1, wherein all of the first polyether polyol, second polyether polyol, and third polyether polyol are selected from the group consisting of propylene oxide-based polyether polyols.

4. The isocyanate reactive component according to claim 1, further comprising a foaming agent comprising at least one of dichlorofluoroethane, cyclopentane, pentafluorobutane, pentafluoropropane, trifluorochloropropylene, and hexafluorobutene.

5. The isocyanate reactive component according to claim 4, wherein the foaming agent additionally includes water.

6. A reactive polyurethane composition useful for the production of polyurethane foams with good and flat surface appearance, comprising:
   an isocyanate component A), the isocyanate component comprising one or more polyisocyanate(s);
   the isocyanate reactive component B) according to claim 1; and
   a foaming agent C).

7. A polyurethane foam obtained by reaction of the reactive polyurethane composition according to claim 6.

8. The polyurethane foam according to claim 7, wherein the core density of the polyurethane foam is 35-70 kg/m3.

9. The polyurethane foam according to claim 7, wherein the closed cell proportion of the polyurethane foam is 85-98%.

10. A discontinuous process for the production of a polyurethane composite comprising a shell and a polyurethane foam therein, comprising the steps:
   i) providing a shell in a mold
   ii) closing the mold
   iii) injecting the reactive polyurethane composition according to claim 6 in the shell in the mold
   iv) foaming the reactive polyurethane composition
   v) releasing the resulting polyurethane composite comprising the shell and the polyurethane foam from the mold.

11. A polyurethane composite prepared by the discontinuous process according to claim 10.

12. A polyurethane composite prepared by the discontinuous process according to claim 10, wherein the shell has a plate-like or hollow cylindrical shape.

13. A method comprising:
   producing an article, utilizing the polyurethane composite according to claim 11, wherein the article is selected from roof panels, side panels, bottom panels, or door panels of a container; roof panels, side panels, bottom panels, or door panels of a prefabricated house; roof panels, side panels, bottom panels, or door panels of a refrigerator house; insulation panels of an air-conditioner; and insulation pipelines.

* * * * *